US006667951B1

United States Patent
Kim

(10) Patent No.: US 6,667,951 B1
(45) Date of Patent: Dec. 23, 2003

(54) PRE-FORMATTING FOR OPTICAL RECORDING MEDIUM HAVING SAME-PHASE WOBBLING AREA AND DIFFERENT-PHASE WOBBLING AREA

(75) Inventor: Dae Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 554 days.

(21) Appl. No.: 09/640,791

(22) Filed: Aug. 18, 2000

(30) Foreign Application Priority Data

Aug. 19, 1999 (KR) ..................................... P1999-34364

(51) Int. Cl.[7] ................................................. G11B 7/24
(52) U.S. Cl. .................................... 369/275.4; 428/64.4
(58) Field of Search ............................. 369/275.4, 111, 369/275.3, 275.2, 44.13, 277, 278, 279; 428/64.4, 64.1, 64.3; 430/320, 321

(56) References Cited

U.S. PATENT DOCUMENTS 5,936,933 A * 8/1999 Miyamoto et al. ....... 369/275.3
6,069,870 A * 5/2000 Maeda et al. ............ 369/275.4
6,208,614 B1 * 3/2001 Kim ........................ 369/275.4
6,295,270 B1 * 9/2001 Van Den Enden et al. ...... 369/275.4

FOREIGN PATENT DOCUMENTS

JP         10021554     1/1998
JP      2000-293856 A * 10/2000 ............. 369/275.4

* cited by examiner

Primary Examiner—Tan Dinh
(74) Attorney, Agent, or Firm—Birch, Stewart, Kolasch & Birch, LLP

(57) ABSTRACT

A method of fabricating an optical recording medium that is adaptive for fabricating a frame wobbling recording medium in which a same-phase wobbling area and a different-phase wobbling area coexist in a track thereof. In the method, a wobbling signal for pre-formatting an identification information for the corresponding area is applied to the first wobbling area. A wobbling signal for pre-formatting an identification information for the first wobbling area positioned at the adjacent tracks is applied to the second wobbling area. A light is irradiated in accordance with a signal in which the two wobbling signals are alternately combined.

14 Claims, 12 Drawing Sheets

PRE-FORMATTING FOR OPTICAL RECORDING MEDIUM HAVING SAME-PHASE WOBBLING AREA AND DIFFERENT-PHASE WOBBLING AREA

FIELD OF THE INVENTION

This invention relates to a method of fabricating an optical recording medium, and more particularly to a method of fabricating an optical recording medium that is adaptive for fabricating an optical recording medium adopting a frame wobbling system in which a same-phase wobbling area and a different-phase wobbling area coexists in a track. Also, the present invention is directed to an exposure apparatus that is adaptive for irradiating a light on a master disc for duplicating an optical recording medium adopting a frame wobbling system.

DESCRIPTION OF THE RELATED ART

Recently, an optical recording medium, an magneto-optical recording medium and so on have been developed as a recording medium for recording various information, such as video and audio information, etc., and have been commercially available in the market. Such an optical recording medium includes a read-only type disc such as CD-ROM and DVD-ROM, etc., a write-once-read-many type disc such as CD-R and DVD-R, etc., and a rewritable type disc such as CD-RW, DVD-RAM, etc.

An identification information including an address information, etc. is recorded on a conventional rewritable disc in advance so that an information can be recorded at a desired position. In an optical disc such as CD-R, etc., land signal tracks 10 and groove signal tracks 12 are formed as shown in FIG. 1, and an identification (ID) information including an address information, etc. is recorded on each side of the groove signal track 12. Such an identification information is pre-formatted in a wobbled pattern on each side of the groove signal track 12 in accordance with a frequency-modulated carrier signal. An address information can be read out by an wobbling signal detected from the wobbled groove signal track 12, and an information can be recorded on a desired position of the disc on a basis of this address information. In such a disc, however, an information recording capacity is limited because an information is recorded only on the groove signal track 12.

A disc (e.g., DVD-RAM) as shown in FIG. 2 has been known as a disc in which an information can be recorded on all the land and groove signal tracks. This disc includes header fields having an identification information including an address information, etc. recorded in a form of pre-pit trains 14 and recording fields consisting of the land and groove signal tracks 10 and 12 wobbled in the same phase. Such a disc has a limited recording capacity because an information can not be recorded on the header field consisting of the pre-fit trains 14.

Meanwhile, an optical recording medium in which same-phase wobbling areas 24A and different-phase wobbling areas 24B each having a predetermined interval are alternated at the land and groove signal tracks 20 and 22, is disclosed in U.S. patent application No. 09/134,368 filed on Aug. 14, 1988 by the applicant. As it were, the optical recording medium is called frame wobbling recording medium. In the frame wobbling recording medium, an information can be recorded on all of the same-phase wobbling area 24A and the different-phase wobbling area 24B by an ID information on the same phase wobbling area 24. Since such a frame wobbling recording medium can record an information on all the land and groove signal tracks 20 and 22 and can record an information on all of the same-phase wobbling area 24A and the different-phase wobbling area 24B in accordance with an ID information on the same-phase wobbling area 24A without a separate ID information, it has an enlarged recording capacity. However, since frame wobbling recording medium has a track structure in which the same-phase wobbling area 24A is alternated with the different-phase wobbling area 24B, it is difficult to fabricate the frame wobbling recording medium using a method similar to the conventional optical recording medium fabricating method.

SUMMARY OF THE INVENTION

Accordingly, it is an object of the present invention to provide a method of fabricating an optical recording medium that is adaptive for fabricating a frame wobbling recording medium.

A further object of the present invention is to provide an exposure apparatus that is adaptive for irradiating a light on a master disc for duplicating a frame wobbling recording medium.

In order to achieve this and other objects of the invention, a method of fabricating an optical recording medium according to one aspect of the present invention includes the steps of providing a wobbling signal for pre-formatting an identification information for the corresponding area with respect to a first wobbling area; providing a wobbling signal for pre-formatting an identification information for the first wobbling area positioned at the adjacent tracks with respect to a second wobbling area; and irradiating a light in accordance with a signal in which the two wobbling signals are alternately combined.

An exposure apparatus for an optical recording medium according to another aspect of the present invention includes wobbling signal generating means for providing a wobbling signal for pre-formatting an identification information for the corresponding area with respect to a first wobbling area and for providing a wobbling signal for pre-formatting an identification information for the first wobbling area positioned at the adjacent tracks with respect to a second wobbling area; and irradiating means for irradiating a light onto a master disc for duplicating the optical recording medium in response to a signal in which the two wobbling signals are alternately combined.

BRIEF DESCRIPTION OF THE DRAWINGS

This and other objects of the invention will be apparent from the following detailed description of the embodiments of the present invention with reference to the accompanying drawings, in which.

DETAILED DESCRIPTION OF THE PREFERRED EMBODIMENT

Figure 1:
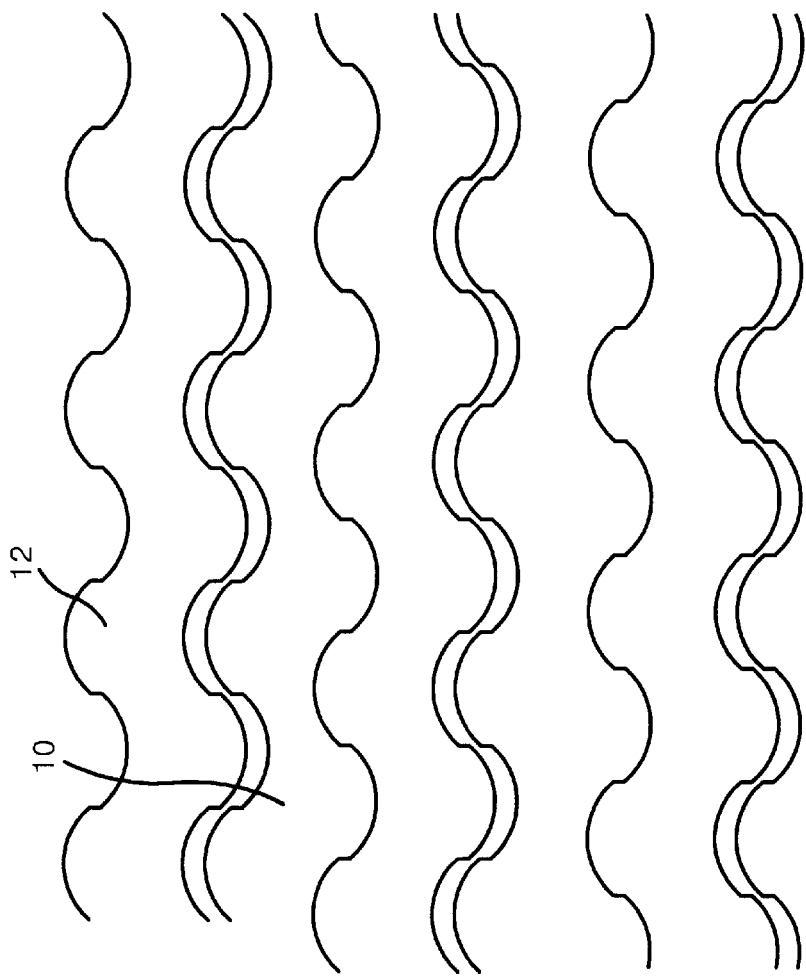
FIG. 1 is a schematic view showing a signal track structure of a CD-R disc.
Figure 2:
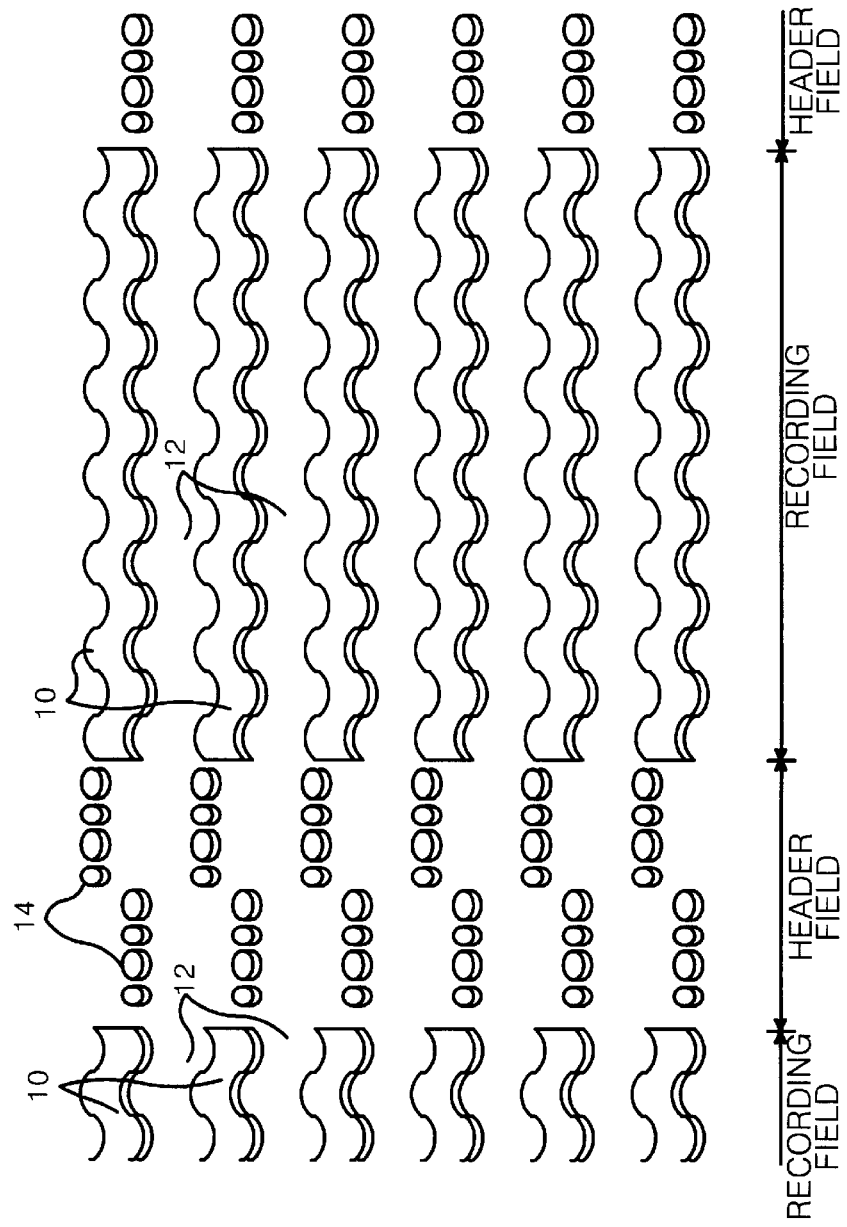
FIG. 2 is a schematic view showing a signal track structure of a DVD-RAM disc.
Figure 3:
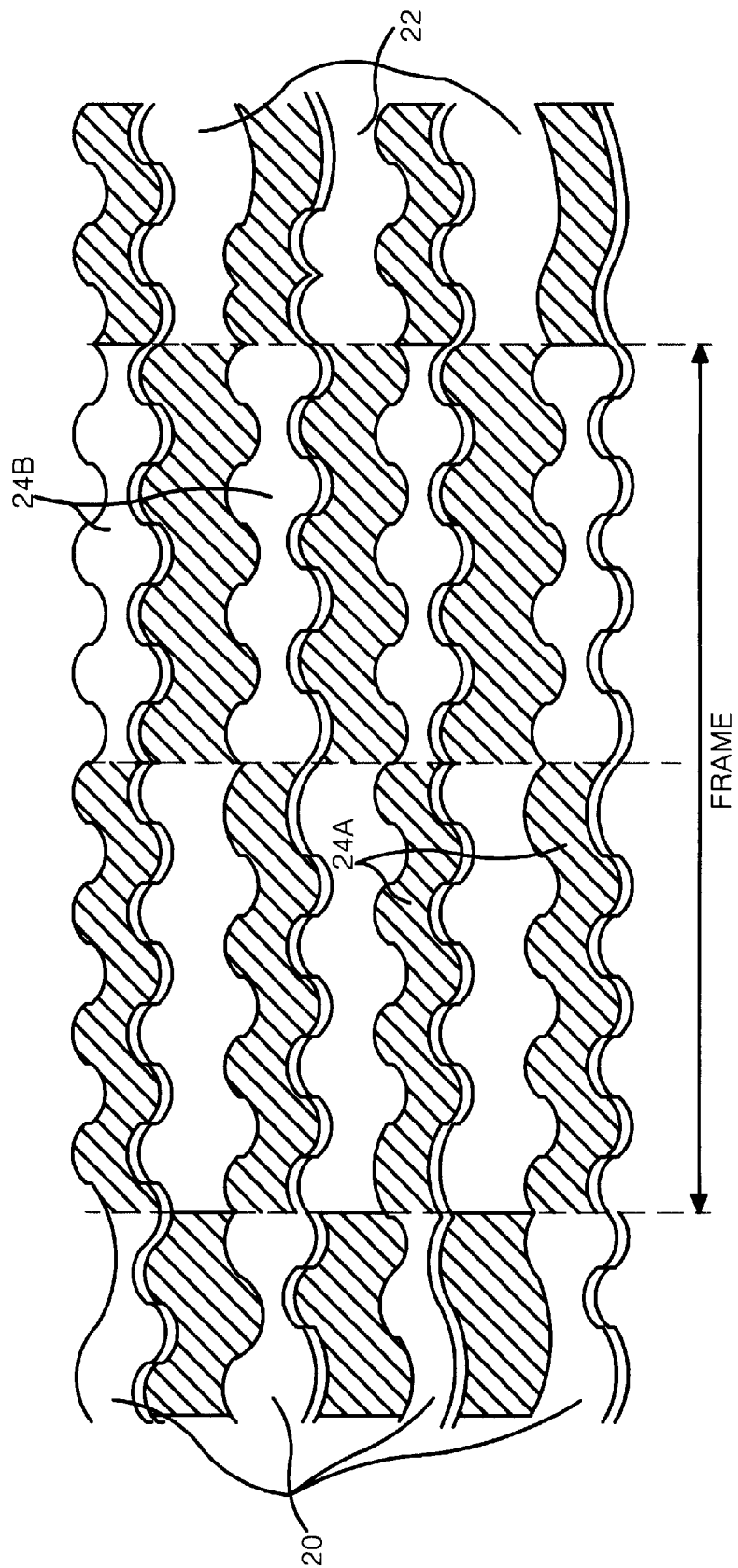
FIG. 3 is a schematic view showing a signal track structure of a disc adopting a frame wobbling system.
Figure 4:
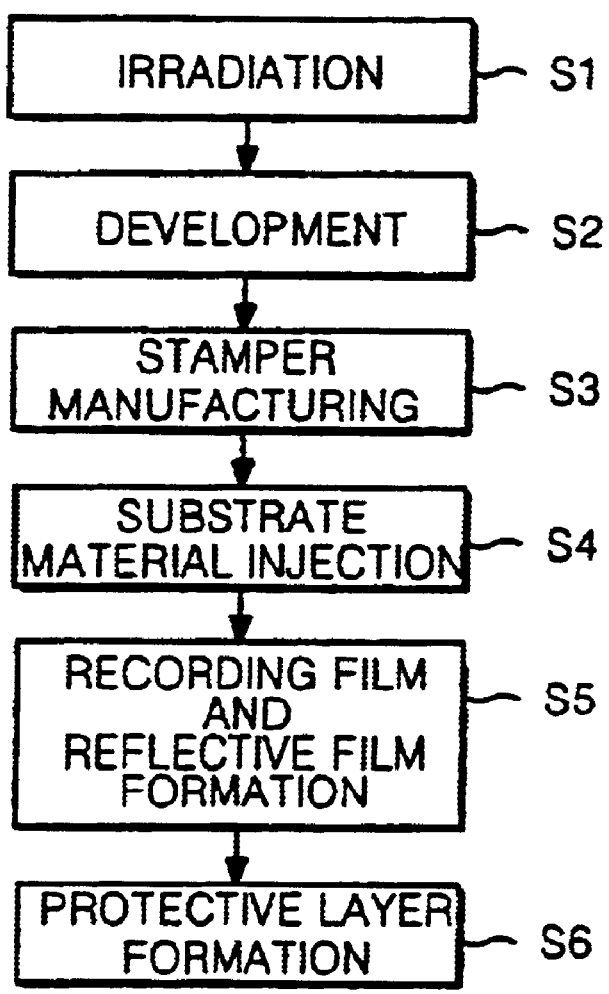
FIG. 4 is a flow chart showing a method of fabricating an optical recording medium according to an embodiment of the present invention step by step.

Referring to FIG. 4, there is shown a method of fabricating an optical recording medium according to an embodiment of the present invention that includes a light-irradiation process S1 and a development process S2 for manufacturing a master disc. The light-irradiation process S1 is a process of exposing a photo-resist film formed fully on a substrate to a laser beam. In the optical recording medium of frame wobbling system as shown in FIG. 3, phases at the left and right sides faced on the land signal track 20 or the groove signal track 22 must be identical to each other at the same-phase wobbling area 24A while they must be different from each other at the different-phase wobbling area 24B. To this end, upon irradiation, the laser beam is individually controlled at each side of the same groove signal track 22. Such an irradiation method will be described in detail later. The photo-resist film exposed to a laser beam is developed by a developer at the developing process S2. If the photo-resist film corresponding to the exposed portion at the developing process S2 is removed, then a master mask for duplicating the frame wobbling recording medium is prepared.

The optical recording medium fabrication method according to the present invention further includes a process S3 of making a stamper, a process S4 of injecting a substrate material, a process S5 of forming a recording film and a reflective film, and a process S6 of forming a protective film. The stamper is made by inverting and imprinting the tracks formed on the master disc. This stamper is installed within a cavity of a mold to which a solved substrate material is injected. A melt substrate material is injected to the mold provided with the stamper. On the disc substrate molded in this manner, a recording film and a reflective film are formed. Finally, when a protective layer is formed on the reflective film, a duplication of the frame wobbling recording medium is completed.

Figure 5:
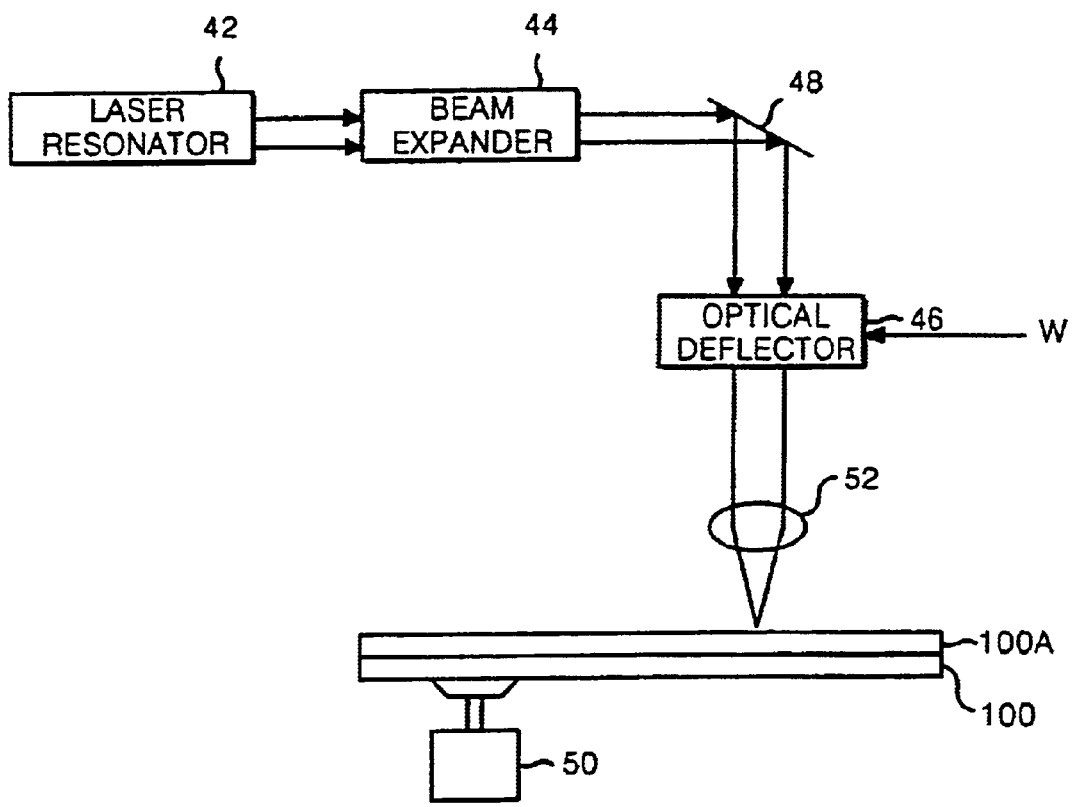
FIG. 5 is a schematic block diagram showing a configuration of an exposure apparatus according to a first embodiment of the present invention.

Referring to FIG. 5, there is shown an exposure apparatus for an optical recording medium according to a first embodiment of the present invention. The exposure apparatus includes a substrate 100 on which a photo-resist film 100A is formed, a spindle motor 50 for rotating the substrate 100, and a beam expander 44, a reflection mirror 48, an optical deflector 46 and an objective lens 52 that are arranged, in series, between the substrate 100 and a laser resonator 42. The spindle motor 50 plays a role to rotate the substrate 100 at a constant velocity. The laser resonator 42 generates a laser beam. The laser beam generated from the laser resonator 42 has a constant flux diameter with the aid of the beam expander 44. The reflection mirror 48 reflects the laser beam from the beam expander 44 into the optical deflector 46. The optical deflector 46 responds to a wobbling signal W including an identification information PID to move the laser beam inputted from the reflection mirror 48. The objective lens 52 focuses the laser beam from the optical deflector 46 onto the photo-resist film 100A on the substrate 100 in a shape of spot. A light spot focused onto the photo-resist film 100A by the objective lens 52 has a different phase for each desired interval in accordance with an wobbling signal inputted to the optical deflector 46 in response to a track structure of the frame wobbling recording medium. Herein, the wobbling signal includes an ID information for the same-phase wobbling area 24A positioned at each side of the groove signal track 22 in the same-phase wobbling area 4A, and an ID information for the same-phase wobbling area 24A positioned at the land signal tracks adjacent to the groove signal track 22 in the different-phase wobbling area 24B.

Figure 6:
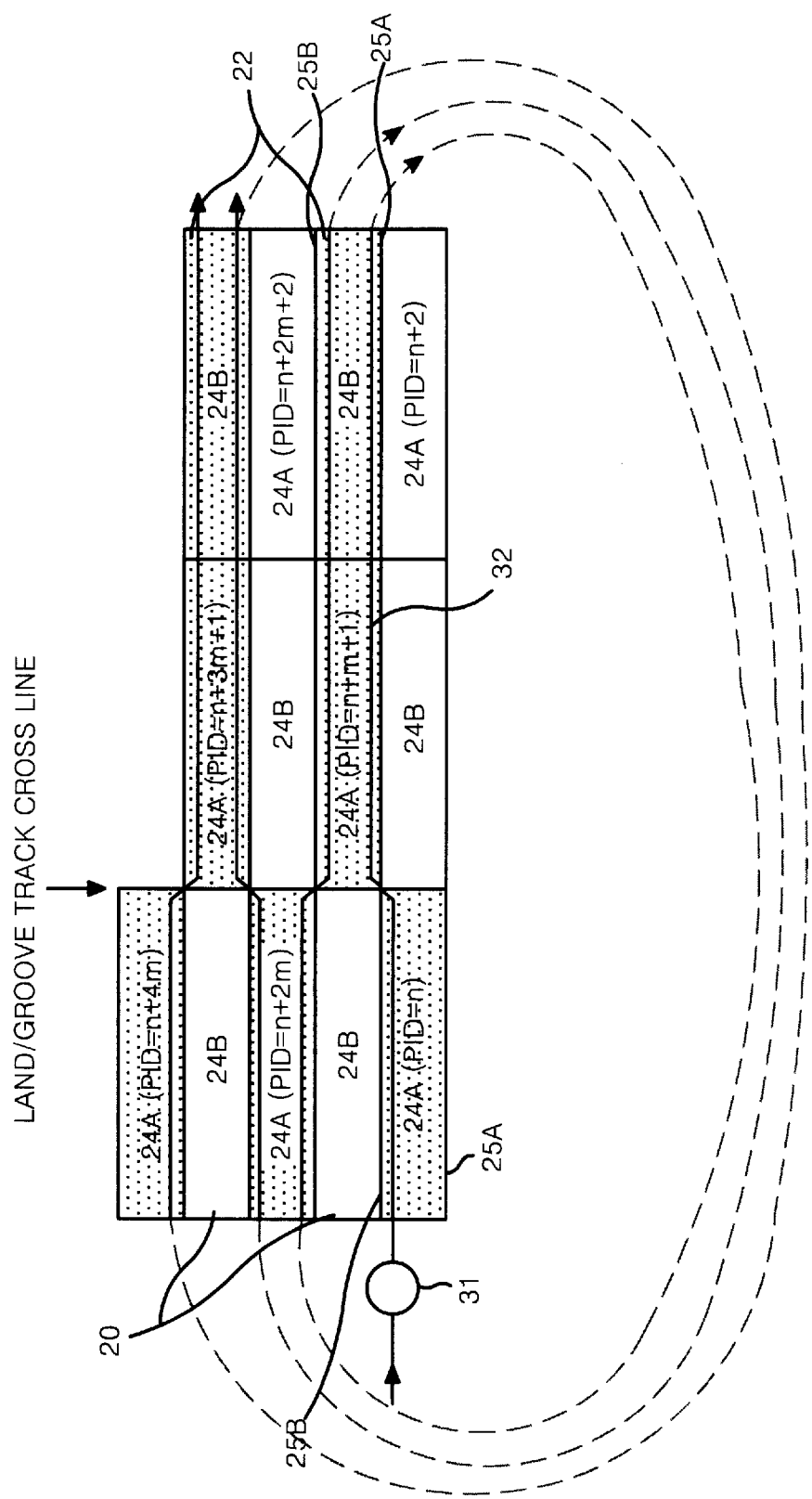
FIG. 6 illustrates the trace of optical spots upon irradiation using the exposure apparatus shown in FIG. 5.

Referring now to FIG. 6, there is shown a single spiral type of frame wobbling recording medium. In the optical recording medium of single spiral type, each of land and groove signal tracks 20 and 22 is provided with a same-phase wobbling area 24A and a different-phase wobbling area 24B. The land signal track 20 is alternated with the groove signal track every one rotation.

In irradiating a light on a master disc for duplicating such an optical recording medium of single spiral type adopting the frame wobbling system, a laser beam spot 31 goes along each side 25A and 25B of the same-phase wobbling area 24A at the groove signal track 22 to record an identification information PID for the same-phase wobbling area 24A positioned at the groove signal track 22 on the photo-resist film 100A in accordance with a wobbling signal inputted to the optical deflector 46. Further, the laser beam spot 31 goes along each side 25A and 25B of the groove signal track 22 to record an identification information PID for the same-phase wobbling area 24A positioned at the land signal tracks 20 adjacent to the corresponding groove signal track in accordance with a wobbling signal inputted to the optical deflector. This laser beam spot 31 records a wobbling signal individually on each side of the groove signal track 22. To this end, the laser beam spot 31 is focused to have a diameter smaller than a width T of the groove signal track 22 and larger than a half width T/2 thereof (i.e., T/2<diameter of beam spot<T).

Figure 7:
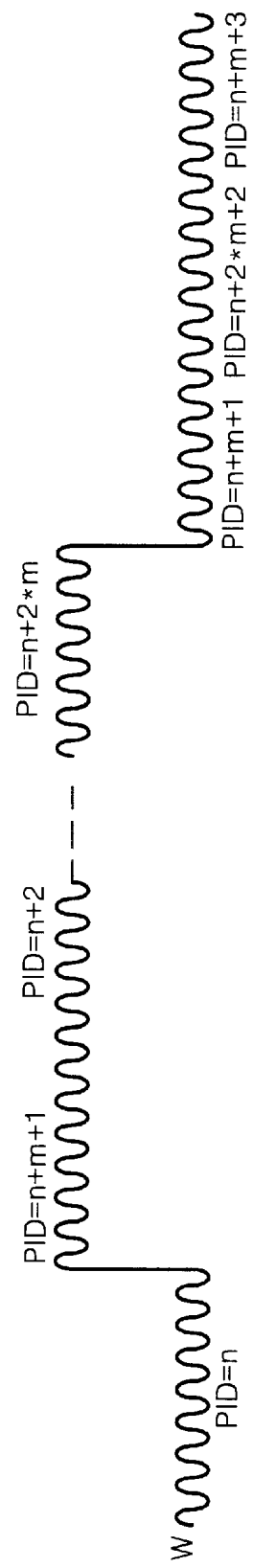
FIG. 7 is a waveform diagram of a wobbling signal controlling the optical spots shown in FIG. 6.

Herein, it is assumed that the laser beam spot 31 begins to be irradiated onto the photo-resist film 100A from a same-phase wobbling area 24A in which the identification information PID is n as shown in FIG. 6. The laser beam spot 31 records an wobbling signal including the frame identification information PID on the first side edge 25A and the second side edge 25B of the groove signal track 22 along a trace 32. At this time, the laser beam spot 31 runs the same groove signal track 22 twice while being alternately shifted upwardly and downwardly by the ½ beam diameter at the land/groove cross line. For instance, assuming that m is the total of the same-phase wobbling area 24A and the different-phase wobbling area 24B included in a single track, the laser beam spot 31 beginning to run from a same-phase wobbling area 24A in which the identification information PID is n, is shifted upwardly by ½ beam diameter at the land/groove track cross line in accordance with a wobbling signal as shown in FIG. 7. Then, the laser beam spot 31 is irradiated onto the photo-resist film 100A along the first side edge 25A of the groove signal track 22 in response to an identification information (PID=n+m+1, PID=n+2, ..., PID=n+2 m) of the same-phase wobbling area 24A and the same-phase wobbling area 24A positioned at the land signal track 20 adjacent to the corresponding groove signal track 22. The laser beam spot 31 running the groove signal track 22 once as described above is again shifted downwardly by ½ beam diameter, and thereafter is irradiated onto the photo-resist film 100A along the second side edge 25B of the groove signal track 22 in response to an identification information (PID=n+m+1, PID=n+2 m+2, PID=n+m+3, . . . ) for the same-phase wobbling area 24A in which the groove signal track 22 is alternated with the land signal track 20.

As described above, in the optical recording medium fabricating method according to the present invention, the laser beam spot 31 is run on the same groove signal track 22 twice upon irradiation of the master disc to pre-format an identification information PID for the same-phase wobbling areas 24A positioned at the groove signal track 22 and the land signal track 20 adjacent thereto at the each of the first and second side edges 25A and 25B of the groove signal track 22. Alternatively, the laser beam spot 31 may be run on the same groove signal track 22 more than three times to pre-format an identification information PID for the same-phase wobbling areas 24A positioned at the groove signal track 22 and the land signal tracks 20 adjacent thereto. In this case, the laser beam spot 31 has a diameter more than ⅓ of the width T of the groove signal track 22 (i.e., T/3<diameter of beam spot), and is run on the same groove signal track 22 more than three times in such a manner to be not overlapped with each other. In other words, the groove signal track 22 can be run more than three times to pre-format an identification information PID for the same wobbling areas 24A being alternated with the corresponding groove signal track 22 and the land signal tracks 20 adjacent thereto at the first and second side edges 25A and 25B of the groove signal track 22 on the mask disc.

Figure 8:
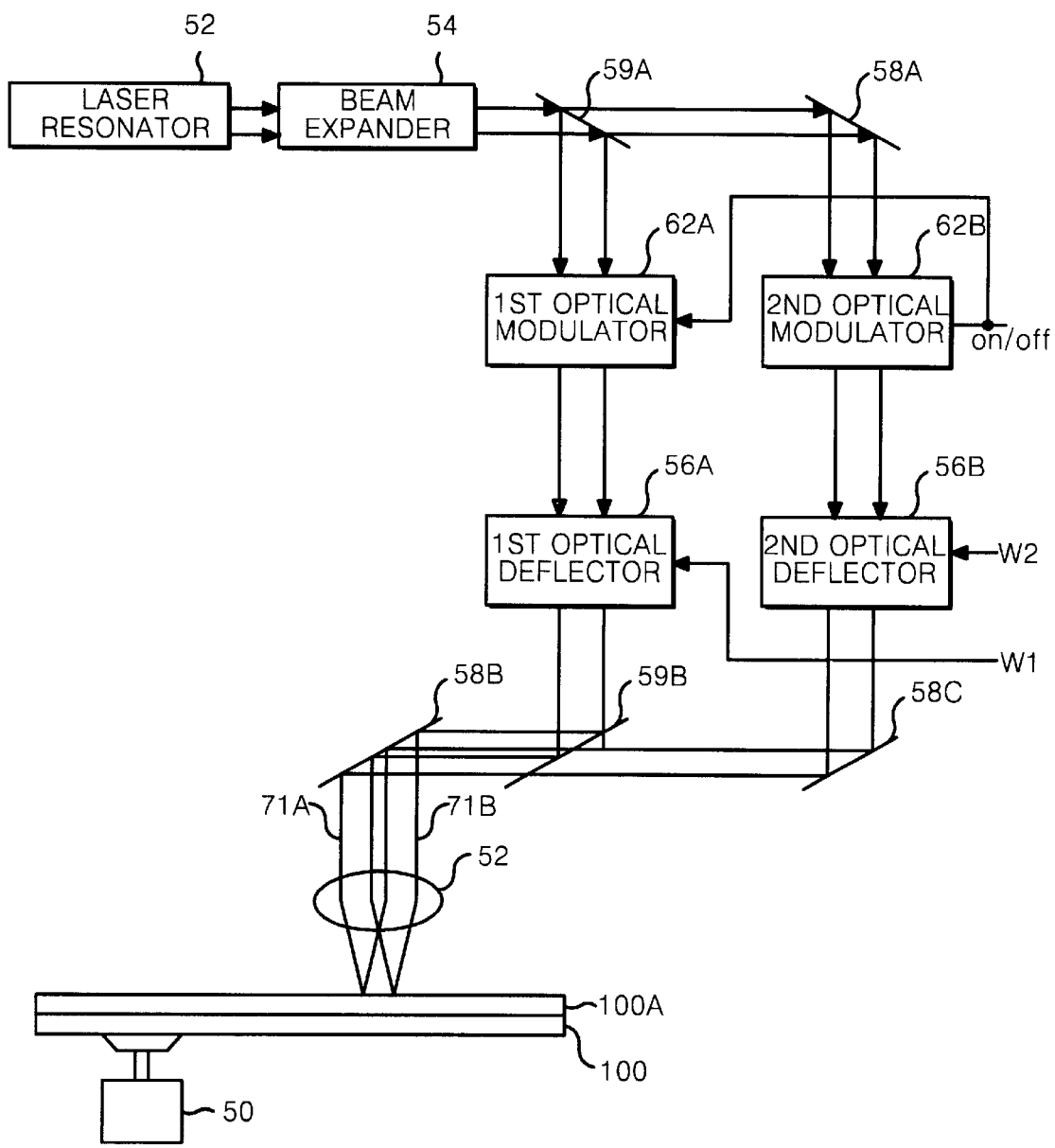
FIG. 8 is a schematic block diagram showing a configuration of an exposure apparatus according to a second embodiment of the present invention.
Figure 9:
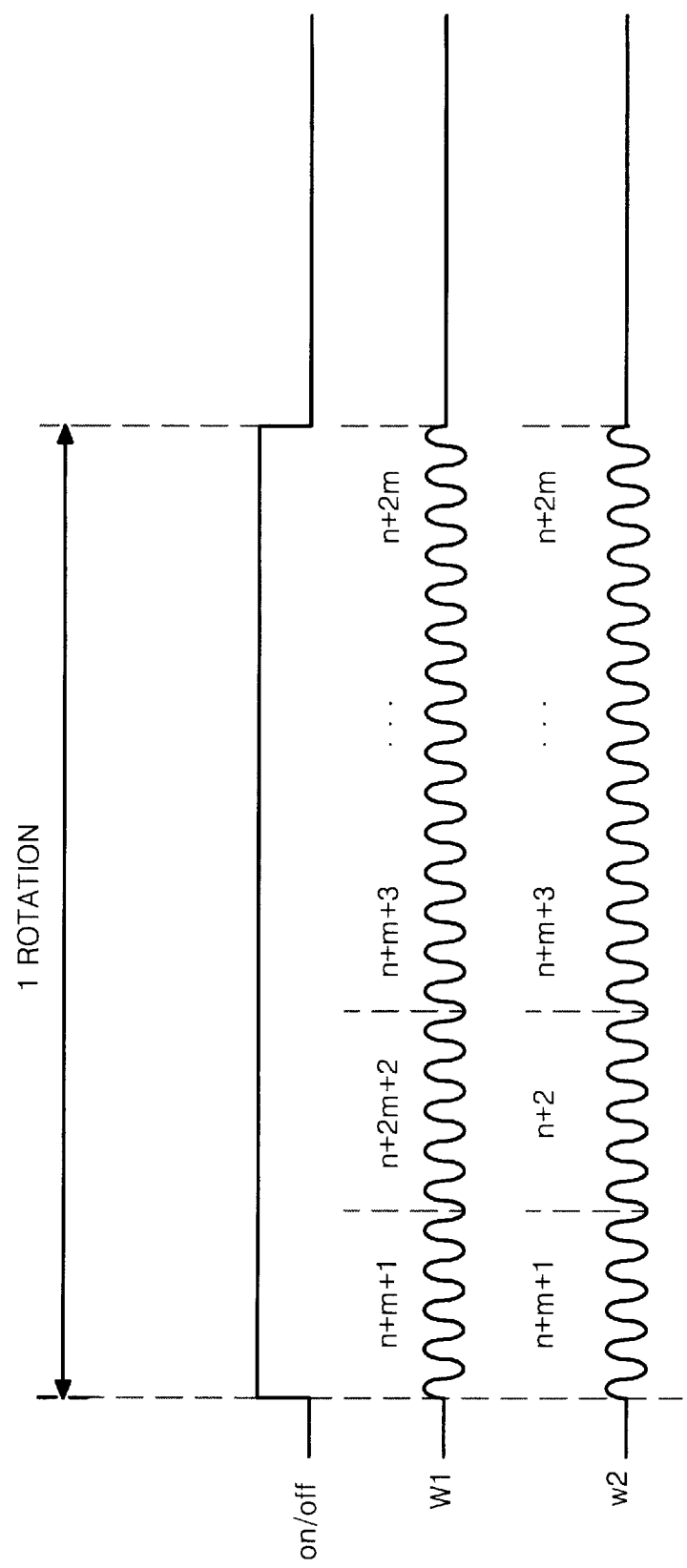
FIG. 9 is waveform diagrams of a light interrupting signal for controlling the optical modulators and the optical deflectors shown in FIG. 8 and wobbling signals.
Figure 10:
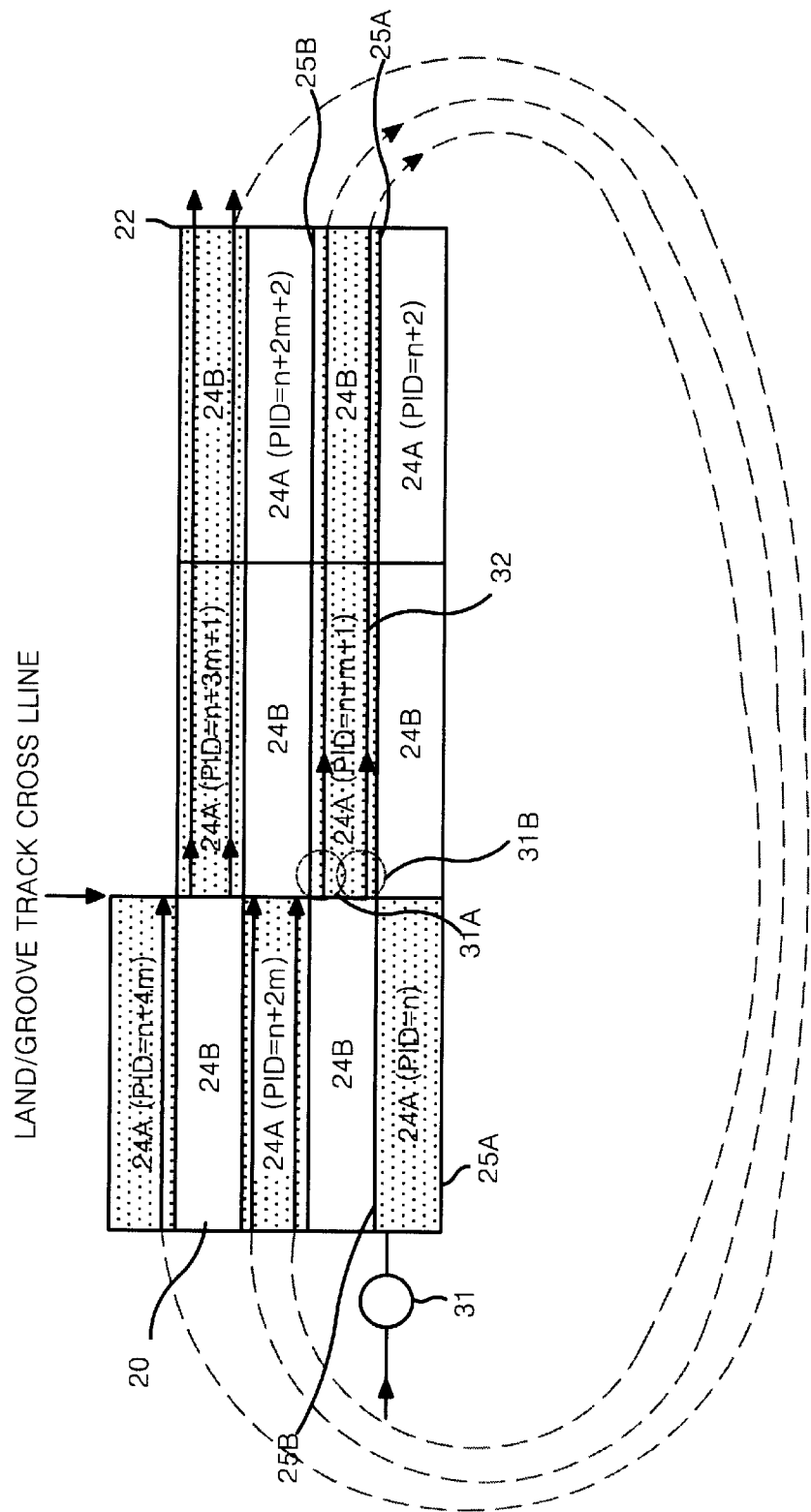
FIG. 10 illustrates the trace of optical spots upon irradiation using the exposure apparatus shown in FIG. 8.

Referring to FIG. 8, there is shown an exposure apparatus for an optical recording medium according to a second embodiment of the present invention. The exposure apparatus includes a substrate 100 on which a photo-resist film 100A is formed, a spindle motor 50 for rotating the substrate 100, a first optical modulator 62A, a first optical deflector 56A, a second half mirror 59B, a second reflection mirror 58B and an objective lens 52 that are arranged, in series, between a first half mirror 59A and the substrate 100, and a second optical modulator 62B, a second optical deflector 56B and a third reflection mirror 58C the are arranged, in series, between the first reflection mirror 58A and the second half mirror 59B. The first half mirror 59A reflects a laser beam from a beam expander 54 into the first optical modulator 62A and, at the same time, transmits it into the second optical modulator 62B. The first reflection mirror 58A makes a full reflection of a laser beam inputted from the first half mirror 59A into the second optical modulator 62B. The first and second optical modulators 62A and 62B switches a light beam inputted thereto in accordance with a light switching signal on/off. The light switching signal on/off has a logical value inverted in a period of one track rotation as shown in FIG. 9. In other words, the light switching signal on/off has a high logic at the groove signal track 22 while maintaining a low logic at the land track 20. The first and second optical modulators 62A and 62B switches a laser beam in a period of on track rotation in response to the light switching signal on/off to irradiate a laser beam on the photo-resist film 100A only at the groove signal track 22. The first optical deflector 56A responds to a first wobbling signal W1 including an identification information PID to move a laser beam. The second optical deflector 56B responds to a second wobbling signal W2 including an identification information PID to move a laser beam in a diameter direction of the substrate 100. The first and second wobbling signals W1 and W2 are generated in a high logic interval of the light switching signal on/off as shown in FIG. 9, and each of which includes an identification information PID for the same-phase wobbling area 24A pre-formatted at the first and second side edges 25A and 25B of the same groove signal track 22. The first wobbling signal W1 includes an identification information (PID=n+m+1, PID=n+2 m+2, PID=n+m+3, . . . , PID=n+2 m) for the same-phase wobbling area 24A being alternated with the groove signal track 22 and the land signal tracks 20 adjacent thereto at the second side edge 25B. The second wobbling signal W2 includes an identification information (PID=n+m+1, PID=n+2, PID=n+m+3, . . . , PID=n+2 m) for the same-phase wobbling area 24A being alternated with the groove signal track 22 and the land signal tracks 20 adjacent thereto at the first side edge 25A. The second half mirror 59B reflects a laser beam from the first optical deflector 56A into the second full-reflection mirror 58B and, at the same time, transmits a laser beam inputted, via the third reflection mirror 58C, from the second optical deflector 56B to the second full-reflection mirror 58B. First and second laser beams 71A and 71B inputted, via the second full-reflection mirror 58B, to the objective lens 52 are focused onto the photo-resist film 100A by means of the objective lens 52. The first and second laser beam spots 31A and 31B focused by the objective lens 52 in this manner record an identification information PID for the same-phase wobbling area 24 on the first and second side edges 25A and 25B of the groove signal track 22 along a trace as shown in FIG. 10.

As described above, in the mask disc of the optical recording medium of single spiral type adopting the frame wobbling system, the laser beam spot 31 controlled by a different wobbling signal is irradiated onto the first and second side edges 25A and 25B of the groove signal track 22 to record an identification information PID for the same-phase wobbling area 24A on the groove signal track 22.

Figure 11:
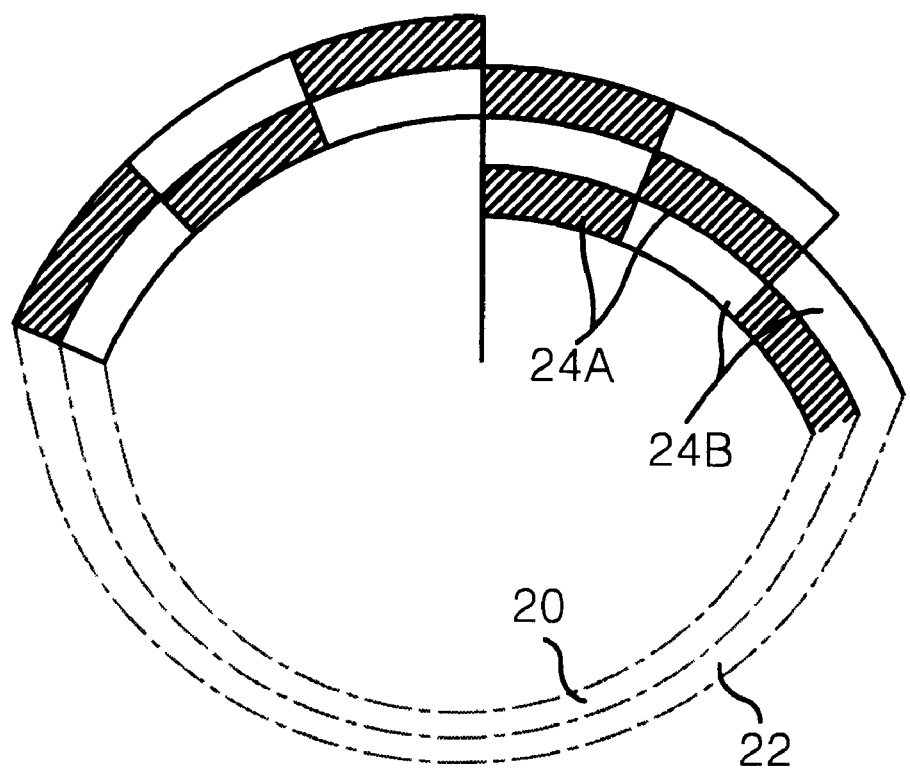
FIG. 11 is a schematic view showing a structure of a two-spiral type disc adopting a frame wobbling system.

Referring now to FIG. 11, there is shown an optical recording medium of two-spiral type adopting the frame wobbling system. In the optical recording medium of two-spiral type, land and groove signal tracks are arranged, in parallel, from the innermost circumference thereof until the outermost circumference thereof in a spiral shape.

Figure 12:
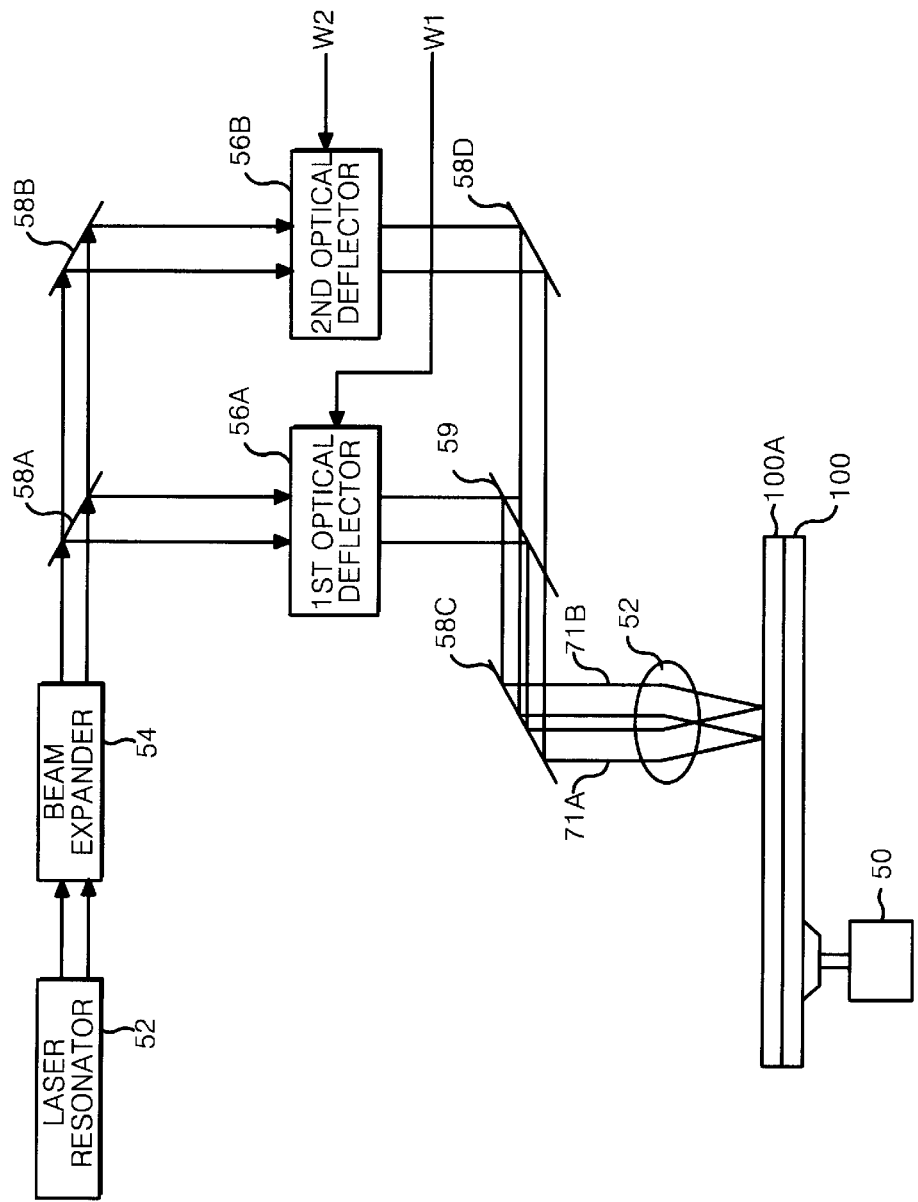
FIG. 12 is a schematic block diagram showing a configuration of an exposure apparatus according to a third embodiment of the present invention.

A master disc for duplicating such an optical recording medium of two-spiral type can be irradiated continuously from the innermost circumference thereof until the outermost circumference thereof with no interruption of a laser beam because the groove signal track 22 is continuous with no intermittence. Accordingly, in the mask disc of the optical recording medium of two-spiral type, the optical modulators 62A and 62B can be eliminated from the exposure apparatus of FIG. 8. In other words, in such a mask disc, an identification information PID for the same-wobbling area 24A is pre-formatted by means of a exposure apparatus as shown in FIG. 12. In this case, the first and second optical deflectors 56A and 56B responds to the first and second wobbling signal W1 and W2 such that an identification information PID for the same-phase wobbling area 24A being alternated with the groove signal track 22 and the land signal track 20 adjacent thereto is recorded on each of the first and second side edges 25A and 25B of the groove signal track 2, thereby controlling first and second laser beams 71A and 71B.

As described above, in the method of fabricating the optical recording medium according to the present invention, the same-phase identification information PID is pre-formatted on the master disc with the aid of the wobbling signal including an identification information PID for the same-phase wobbling area 24A being alternated with the corresponding groove signal track 22 and the land signal track 20 adjacent thereto at each side of the groove signal track 22. Accordingly, the optical recording medium fabricating method according to the present invention is suitable for fabricating a frame wobbling recording medium in which the same-phase wobbling area is alternated with the different-phase wobbling area in the signal tracks.

The exposure apparatus according to the present invention inputs the wobbling signal in which a wobbling signal including the identification information PID for the same-phase wobbling area 24A positioned at the groove signal track 22 is combined with a wobbling signal including the identification information PID for the same-phase wobbling area 24A positioned at the land signal track 20 adjacent to the corresponding groove signal track 22. Accordingly, the exposure apparatus is controlled by the wobbling signals including the identification information PID for the same-phase wobbling area 24A positioned at the groove signal track and the land signal track 20 adjacent thereto to pre-format the identification information PID for the same-phase wobbling area on each side edge of the groove signal track 22, so that it is adaptive for irradiating a light on the master disc for duplicating the frame wobbling recording medium.

Although the present invention has been explained by the embodiments shown in the drawings described above, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their equivalents.

What is claimed is:

1. A method of fabricating an optical recording medium in which a first wobbling area having each side of a track thereof wobbled in a same phase is alternated with a second wobbling area having each side of a track thereof wobbled in a different phase, comprising the steps of:

providing a wobbling signal for pre-formatting an identification information for the corresponding area with respect to the first wobbling area;

providing a wobbling signal for pre-formatting an identification information for the first wobbling area positioned at the adjacent tracks with respect to the second wobbling area; and irradiating a light in accordance with a signal in which the wobbling signals are alternately combined.

2. The method as claimed in claim 1, wherein the irradiating step uses a single light beam.

3. The method as claimed in claim 2, wherein said irradiation is made twice per one rotation of the track.

4. The method as claimed in claim 2, wherein a spot diameter of the light beam is smaller than a width of the track.

5. The method as claimed in claim 1, wherein the irradiating step uses at least two light beams, and the irradiation is made simultaneously on each side of the track.

6. The method as claimed in claim 1, wherein the optical recording medium is formed such that a land signal track is alternated with a groove signal track every rotation of the track.

7. The method as claimed in claim 1, wherein the optical recording medium is formed to have such a spiral shape that a land signal track and a groove signal track are continuous from the inner circumference thereof until the outer circumference thereof.

8. An exposure apparatus used to fabricate an optical recording medium in which a first wobbling area having each side of a track thereof wobbled in a same phase is alternated with a second wobbling area having each side of a track thereof wobbled in a different phase, comprising:

wobbling signal generating means for providing a wobbling signal for pre-formatting an identification information for the corresponding area with respect to the first wobbling area and for providing a wobbling signal for pre-formatting an identification information for the first wobbling area positioned at the adjacent tracks with respect to the first wobbling area; and irradiating means for irradiating a light onto a master disc for duplicating the optical recording medium in response to a signal in which the wobbling signals are alternatively combined.

9. The exposure apparatus as claimed in claim 8, wherein the irradiating means uses a single light beam.

10. The exposure apparatus as claimed in claim 9, wherein the irradiation means irradiates a light twice per one rotation of the track.

11. The exposure apparatus as claimed in claim 9, wherein a spot diameter of the light beam focused on the master disc by means of the irradiating means is smaller than a width of the track.

12. The exposure apparatus as claimed in claim 8, wherein the irradiating means uses at least two light beams, and irradiates a light simultaneously on each side of the track.

13. The exposure apparatus as claimed in claim 8, wherein the optical recording medium is formed such that a land signal track is alternated with a groove signal track every rotation of the track.

14. The exposure apparatus as claimed in claim 8, wherein the optical recording medium is formed to have such a spiral shape that a land signal track and a groove signal track are continuous from the inner circumference thereof until the outer circumference thereof.

* * * * *